Jan. 15, 1929.
C. A. HARVEY ET AL
1,699,357
WINDOW WIPER
Filed Sept. 10, 1927
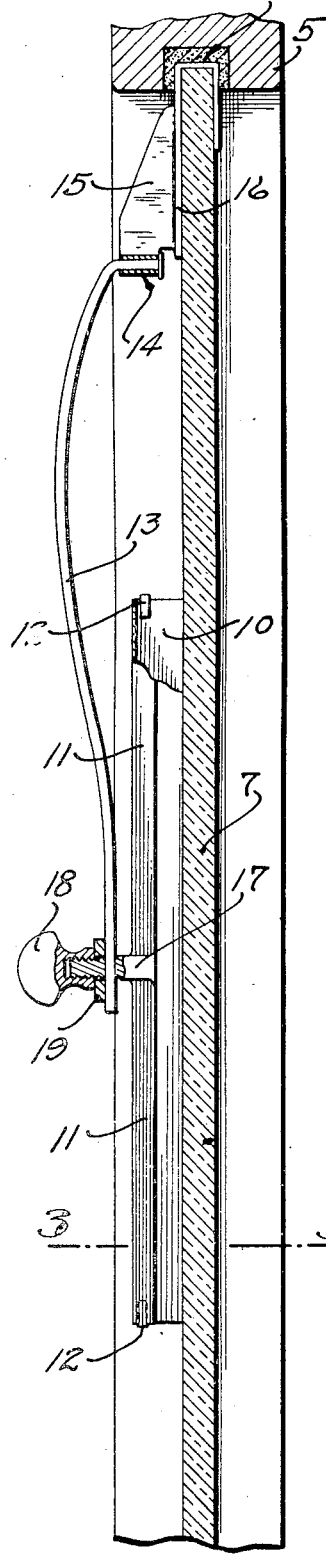
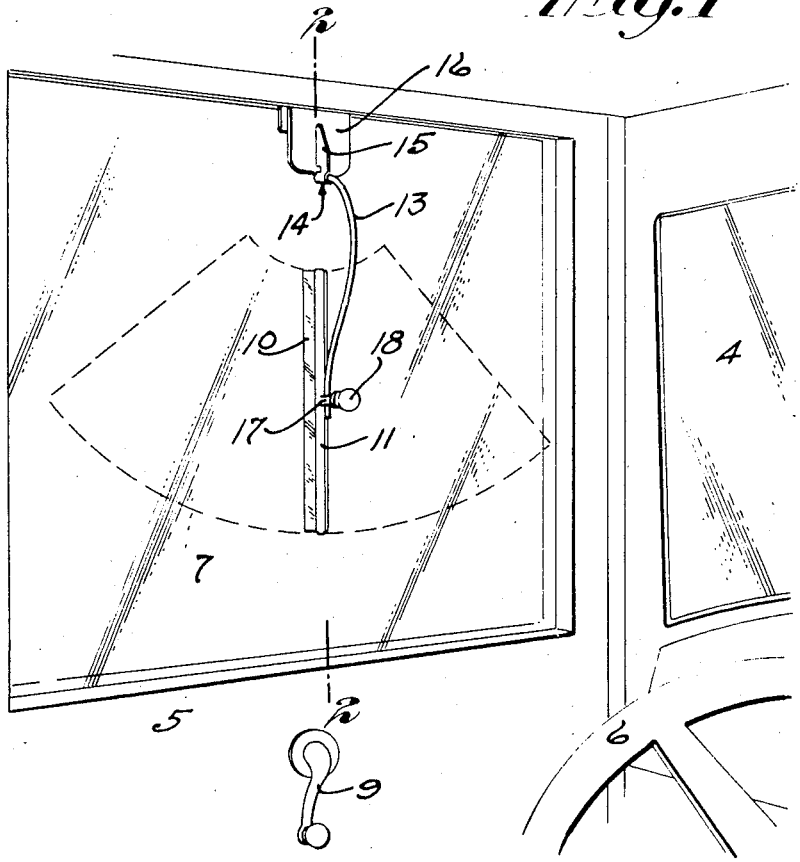
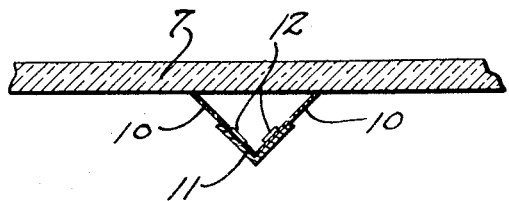
Inventors
Cavour A. Harvey
Glen N. Hanson
By their Attorneys Patented Jan. 15, 1929.

1,699,357

UNITED STATES PATENT OFFICE.

CAVOUR A. HARVEY AND GLEN N. HANSON, OF MINNEAPOLIS, MINNESOTA.

WINDOW WIPER.

Application filed September 10, 1927. Serial No. 218,798.

Our invention has for its object the provision of a simple and highly efficient window wiper of the type commonly called a wind shield wiper intended for general use, but especially adapted for use in connection with the wind shield or windows of a closed automobile.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary perspective view showing the window wiper applied to the left-hand door of a closed automobile body;

Fig. 2 is a fragmentary view partly in elevation and partly in vertical section taken on the line 2—2 of Fig. 1, on an enlarged scale; and Fig. 3 is a detail view in section taken on the line 3—3 of Fig. 2.

Of the parts of the automobile illustrated, it is important to note the wind shield 4, left-hand door 5, and steering wheel 6. The door 5 is provided with a vertically adjustable window in the form of a glass panel 7, the upper edge of which, when closed, projects into a channel seat 8 in the top member of said door. The customary or any suitable means including the hand crank 9 is provided for raising and lowering the window 7, but for the purpose of this case, it is not necessary to illustrate the same.

The numeral 10 indicates a pair of reversely-acting spring steel blades mounted in a V-shaped holder 11 and held thereby in diverging relation, as best shown in Fig. 3. These blades 10 are independently and removably held in the holder 11 by short keeper lugs 12 integrally formed with the ends of said holder and overlapping the blades 10. Said blades 10 have flat contact with the inner faces of the holder 11 and their inner longitudinal edges engage either said holder 11, at the apex thereof, or one another as an abutment to limit their movement into the holder 11. The outer longitudinal edges of the blades 10 are sharp and have direct contact with the glass panel 7 and are held by the holder 11 in transversely oblique relation thereto.

The blades 10 are yieldingly pressed against the glass panel 7 by a relatively stiff spring arm 13, the inner end of which is bent laterally perpendicular to the glass panel 7 and swivelled in a tubular bearing 14 on an upstanding fin 15. This fin 15 is formed with an attaching bracket 16 which holds the arm 13 for swinging movement in a plane parallel to the glass panel 7.

The attaching bracket 16 is U-shaped in cross section and adapted to straddle one edge of a glass panel, as shown the upper edge of the glass panel 7. This attaching bracket 16 is adapted to be moved into the seat 8 with the upper edge portion of the glass panel 7 and thereby rigidly holding the attaching bracket 16 in position on the glass panel 7. Primarily, the side members of the attaching bracket 16 are in slightly converging relation so that they must be swung apart when placed over the glass panel 7 and thereby frictionally clamp said attaching bracket 16 to the glass panel 7.

The holder 11 is adjustably attached to the outer end of the arm 13 by being inserted endwise through a passageway in an upstanding stud 17 integrally formed with the holder 11 with said holder longitudinally aligned with the arm 13.

A nut-acting thumb piece 18 has screw-threaded engagement with the outer end of the stud 17 and a washer 19 is applied to the stud 17 between the arm 13 and thumb piece 18. The washer 19, under the action of the thumb piece 18, frictionally clamps the arm 13 onto the stud 17 with the holder 11 set in different endwise adjustments in respect to the attaching bracket 16 and also turned on the arm 13 so that both blades 10 have direct contact with equal pressure on the glass panel 7. The tension of the spring arm 13 is such as to tend to spread the blades 10 so that they are securely held against the glass panel 7 to produce a cutting action.

The occupant of the car, by taking hold of the thumb piece 18, may swing the arm 13 and thereby cause the blades 10 to produce a wiping action on the glass panel 7, as shown by broken lines in Fig. 1. The steel blades 10 will remove all moisture, frost, ice or other accumulation on the glass panel 7 so that the occupant has a clear vision through the field covered by the wiping action of the device.

The attaching bracket 16 may be very quickly applied to a glass panel or removed therefrom and it is evident that the same may be applied to vertically movable wind shields in the same manner in which it is applied to the glass panel 7.

What we claim is:

1. A device of the class described comprising an attaching bracket adapted to be fitted over the edge portion of a glass panel slidably mounted in a frame and be carried by said panel into a seat in the frame for the glass panel to hold the bracket in position on the glass panel, a swingable arm pivoted to the bracket, and a wiper blade carried by the arm.

2. A device of the class described comprising a channel-shaped attaching bracket adapted to straddle the edge portion of a glass panel slidably mounted in a frame and be carried by said panel into a seat in the frame for the glass panel to hold the bracket in position on the glass panel, said bracket having an outstanding fin on one of its side members, a swingable arm pivoted to the fin, and a wiper blade carried by the arm.

In testimony whereof we affix our signatures.

CAVOUR A. HARVEY.
GLEN N. HANSON.